Patented June 5, 1928.

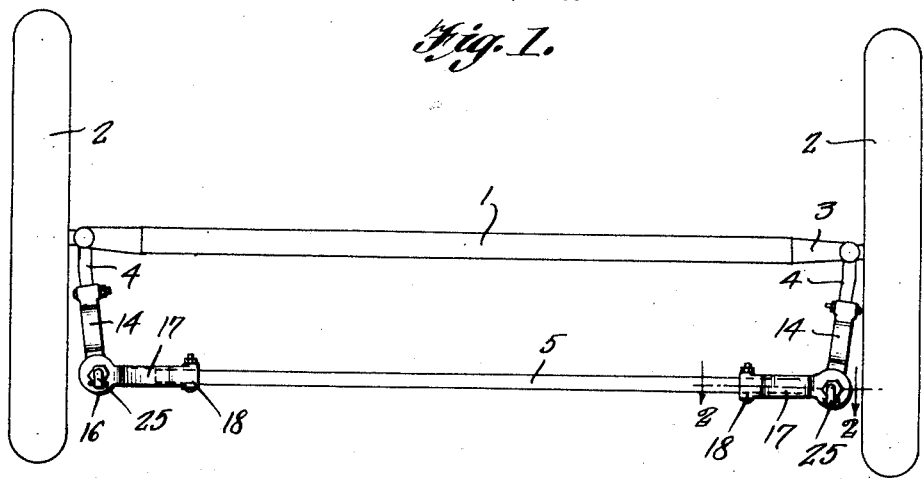
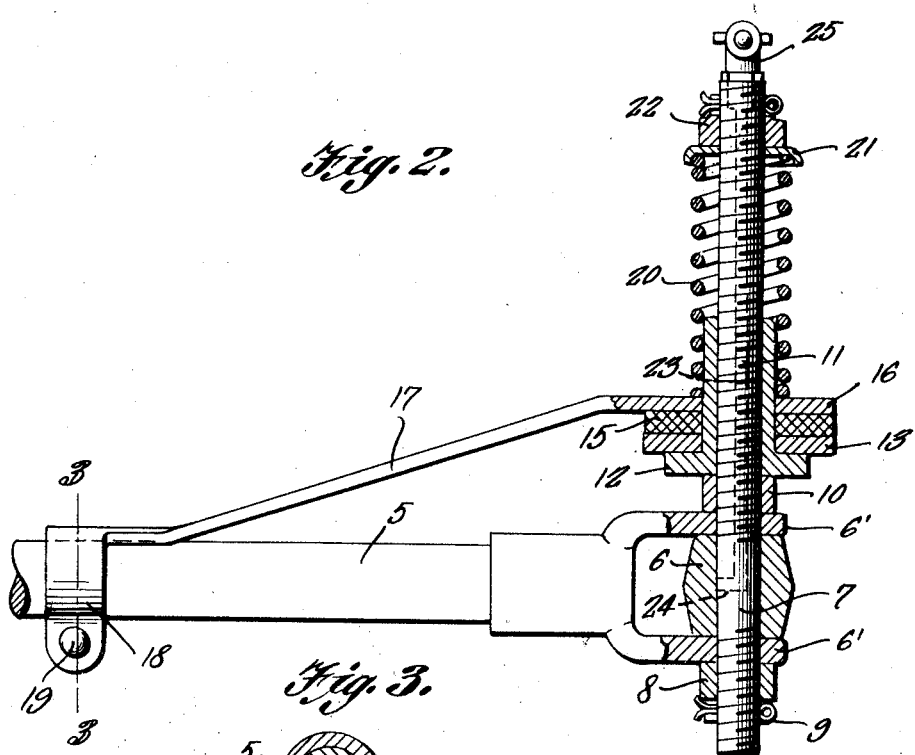
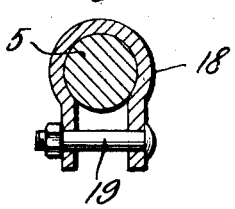

1,672,820

UNITED STATES PATENT OFFICE.

EDWARD MADDY, OF WICHITA, KANSAS.

STABILIZER.

Application filed October 2, 1926. Serial No. 139,161.

This invention relates to new and useful improvements in stabilizers, and more particularly to a device of this character which is especially adapted for use in connection with a steering mechanism of motor vehicles, the main object of the present invention being the provision of a stabilizer adapted to be attached to the steering mechanism of a motor vehicle whereby, to absorb the shock and vibrations caused, due to the travel of the vehicle over rough roads, and is so constructed as to maintain the vehicle in a direct course while traveling over rough roads and around curves.

Another object of the invention is the provision of a device of which character is so constructed that the same may be readily attached or detached from various types of vehicles and is further so constructed as to be quickly and easily lubricated to provide for the proper working of the parts.

With the above and other objects in view the invention consists in the novel features of construction, the combination and arrangement of parts hereinafter more fully set forth, pointed out in the appended claim, and shown in the accompanying drawings, in which:—

Figure 1 is a plan view of a front axle of a vehicle illustrating the application of my invention.

Figure 2 is an enlarged sectional view taken on the line 2—2 of Figure 1, and

Figure 3 is a transverse section taken on the line 3—3 of Figure 2.

Referring now more particularly to the drawings, 1 indicates the axle of a motor vehicle having a wheel 2 at each end thereof and the usual steering spindles 3 adjacent the wheels. The spindles 3 are provided with the usual spindle arms 4 which are connected with the tie rod 5 directly in the rear of the axle 1.

In a great many makes of motor vehicle, the connection between the spindle arm and the tie rod becomes worn, resulting in too much play in the connection between the two parts, causing the front wheels to shimmy about during the travel of the vehicle over rough roads. This renders steering difficult and as stated heretofore it is one of the objects of my invention to overcome the shimmy and at the same time to provide a suitable stabilizer for the steering mechanism. The outer end of the arm 4 is provided with a sleeve 6 and the ends of the tie rod 5 are provided with spaced perforated ears 6' positioned at opposite ends of the sleeve 6 and in order to connect the ends of the tie rod and the arms 4, I provide a bolt 7 which extends through the perforated gears and the sleeve and has threaded thereon at its lower end a nut 8, which is locked in position by a cotter pin 9. The bolt 7 has its upper end extending beyond the upper ear of the tie rod and is threaded as shown in Figure 2. Threaded upon the bolt 7 and bearing against the upper end of the tie rod is a nut 10 and threaded onto the bolt 7 above the nut 10 is a sleeve 11, the lower end of which is provided with an annular flange 12. Positioned upon this flange is the enlarged end 13 of an attaching arm 14, the outer end of said arm being provided with down turned tongues positioned upon opposite sides of the arm 4 and securely bolted together.

The enlarged disk like end 13 of the arm 14 is mounted upon the sleeve 11 and rests upon the flange 12 and positioned upon the enlarged end is a friction washer 15. Positioned upon the friction washer is the enlarged disk like member 16 of a second arm 17, the outer end of which is provided with spaced perforated ears 18 adapted to be connected to the tie rod by means of a clamping bolt 19.

In order to retain the two like ends 13 and 16 in frictional contact with the washer 15 a coil spring 20 is provided, the lower end of which is mounted upon the sleeve 1 and bears against the upper face of the enlarged end 16, said spring being retained under tension by means of a cap 21 which is retained in engagement with the outer end of the spring by means of a nut 22. Thus the tension of the spring may be adjusted to regulate frictional contact between the members 12 and 16 and the washer 15, so as to accomplish the purpose mentioned, yet permit ready operation of the steering mechanism.

In order to provide for proper lubrication of the parts of the device, the bolt 7 is provided with a central longitudinal bore 23 which has an outlet 24 in the sleeve 6 and closing the outer end of the bore at the upper end of the bolt is a lubricating cup 25 of any well known type.

It will be apparent from the foregoing that I have provided an inexpensive stabilizer which can be quickly attached to any well known make of motor vehicle by removing the bolt which connects the spindle arms with the tie rod and replacing the same by the bolt 7 of my device and clamping the arms 14 and 17 in position on the spindle arms and tie rod respectively. It will further be apparent that the friction between the parts including the disk like ends 13 and 16 and the washer 15 may be increased or decreased by adjusting the tension of the spring 20 and the washer 15 renewed when desired.

While I have shown and described the preferred embodiment of my invention it will be apparent that various changes and alterations may be carried out for reducing the invention to practice without departing from the spirit of the same or the scope of the appended claim.

Having described the invention, what I claim is:—

A stabilizing device comprising a tubular threaded bolt used between the tie rod and the steering arm of an automobile steering apparatus, a sleeve threaded on the upper end of said bolt, and a flange formed on the sleeve to support a means for bracing the tie rod and steering arm.

EDWARD MADDY.